United States Patent [19]
Rosenfeld et al.

[11] 3,975,102

[45] *Aug. 17, 1976

[54] SCANNING PHOTOELECTRIC AUTOCOLLIMATOR

[75] Inventors: Alvin H. Rosenfeld, Cromwell; Carl A. Zanoni, Middletown, both of Conn.

[73] Assignee: Zygo Corporation, Middlefield, Conn.

[ * ] Notice: The portion of the term of this patent subsequent to May 27, 1992, has been disclaimed.

[22] Filed: Mar. 31, 1975

[21] Appl. No.: 563,326

Related U.S. Application Data

[63] Continuation-in-part of Ser. No. 492,781, July 29, 1974, Pat. No. 3,885,875.

[52] U.S. Cl. .................................. 356/167; 356/2; 356/120
[51] Int. Cl.² ........................................ G01B 11/30
[58] Field of Search ...................... 356/2, 120, 167; 250/211 K

[56] References Cited
UNITED STATES PATENTS

| | | | |
|---|---|---|---|
| 3,529,884 | 9/1970 | Ives et al. .............................. | 350/6 |
| 3,715,165 | 2/1973 | Smith .................................... | 356/167 |
| 3,885,875 | 5/1975 | Rosenfeld et al. .................... | 356/120 |

OTHER PUBLICATIONS

Born et al., *Principles of Optics*, Pergamon Press, New York, 1959, pp. 302–303.

*Primary Examiner*—John K. Corbin

[57] ABSTRACT

An electro-optical apparatus is disclosed which provides outputs proportional either to the surface profile and the first derivative of the surface profile of a reflecting surface or to some light beam deviating property of a transparent article in a non-contacting manner over a plurality of lines over the article being measured. A narrow beam of laser light is scanned in a raster pattern over the article to be measured. A uniformly rotating, multi-faceted reflector device which has suitably chosen pyramidal angles and which is placed near the focal point of a collimating lens moves the scanning laser beam, denoted the measurement beam, across the article to be measured in a series of laterally spaced lines. The scanning beam is nominally perpendicular to the article being measured. The measurement beam is either reflected by the surface of a reflective test article, or auto-reflected by a master reflector surface for double-pass transmission through a transparent test article. After probing the test article, the measurement beam is focused onto a two-axis photoelectric position sensor by the collimating lens. Electronic circuitry processes the signals generated by the photoelectric position sensor to provide outputs indicative of the surface profile and the first derivative of the surface profile, or some light beam deviating property of a transparent article, independent of the tilt of the test article surface relative to the scanning measurement beam. Most importantly, the apparatus provides outputs over the entirety of the test article which are solely a function of the properties of the article being measured.

9 Claims, 13 Drawing Figures

SCANNING PHOTOELECTRIC AUTOCOLLIMATOR

This application is a continuation-in-part of our application Ser. No. 492,781 filed July 29, 1974, now U.S. Pat. No. 3,885,875.

BACKGROUND OF THE INVENTION

1. Field of the Invention

The present invention is an apparatus useful for measuring either the surface profile and the first derivative of the surface profile of a reflecting surface, or the light beam deviating property of a transparent article. It is especially suited for measuring large quantities of test articles quickly, automatically, and economically with non-contacting, non-destructive means.

2. The Prior Art

In many industrial operations it is necessary to measure the surface profile of a reflecting surface, or to measure some light beam deviating property of transparent articles of large quantities of semi-manufactured and finished products.

Previously known contacting techniques for measuring surface profile are not feasible for measuring large quantities of articles. They generally require contact between the test article surface and a reference surface or a probe, thereby imposing stringent requirements of care on the operation to prevent damage to the test article. Optical interference and Moiré fringe are typical methods using a reference surface. Both methods yield a fringe pattern corresponding to contour lines of constant elevation. The departures of the fringe pattern from a reference pattern are indicative of the deviations of the test article surface geometry. An operator must visually evaluate the fringe pattern. If the surface deviations are irregular and correspond to more than one fringe, the resulting fringe pattern is so complex as to preclude easy interpretation and quantitative use.

Measuring machines which move either a contacting or non-contacting probe over the test article surface are generally quite slow because of the time required to trace a useful number of contours. Furthermore, the need for precise mechanical scanning is costly, and great care is needed to assure reliable operation.

Optical sensors have advantages because of the nature of light itself. The principal advantages are:

1. Optical measurements can be extremely accurate.
2. A light beam can be scanned rapidly and precisely.
3. Light variations are directly convertible to electrical signals.
4. The response time is limited to that of the photodetector and its electronics.
5. They do not require direct mechanical contact between the sensor and the object to be measured.
6. Light can be used to carry out transmissive measurements.
7. Light does not chemically deteriorate or deform the surface under test.
8. The distance from the sensor to the object to be measured can be large.
9. The measurements are independent of the chemical composition of the object.

Prior-art optical methods have not always proved satisfactory since many such devices are difficult to use, provide insufficient data, or data which are difficult to interpret.

Prior art non-contacting optical methods include interferometry, image blur detectors, and hybrid interference — Moiré apparatus.

Interferometers provide high sensitivity and accuracy. The interferometer output is a fringe pattern corresponding to a pattern of contour lines. The departures of the fringe pattern from a reference pattern are indicative of the light beam deviating properties and, hence, of the surface geometry of a reflective test article or the deviations of some light beam deviating properties of a transparent test article. An operator must visually evaluate the fringe pattern. If the deviations correspond to more than one fringe (typically λ/2 or 0.000012 in.) and are irregular, the resulting fringe pattern is so complex as to preclude easy interpretation and quantitative use. By photoelectrically sensing the phase information in the fringe pattern, it is of course possible to obviate the above problems, but at a substantial increase in complexity and cost.

Essentially, for many applications, an interferometer is too sensitive. An interferometer's sensitivity can be reduced by working at high angles of incidence to the test article surface. To achieve a reasonable decrease in sensitivity, the angle of incidence is very large, e.g., 80° – 85°. While the oblique incidence interferometry may be useful for some applications, problems with vignetting, the desire for variable sensitivity, and the need to measure transparent articles preclude its use for many others.

An apparatus for measuring automatically the flatness of mirrorreflecting surfaces is disclosed in Plummer et al. U.S. Pat. No. 3,761,179 issued Sept. 25, 1973. This technique is suited to measuring large quantities of articles and is essentially based on image blur sensing for its operation. It is essentially a photoelectric Hartmann test. Therefore, it works by sensing variations in light intensity produced by the nonflatness of the mirror surface under test. While this technique is useful for some applications, it is quite complex optically, mechanically, and electronically. Since it depends on variations of the light intensity to transduce the surface deviations, the outputs are not easily related to the surface topography.

Moiré fringe techniques are also used to obtain contours of surfaces. Although the Moiré fringe techniques are less sensitive than optical interferometry, a range of dimensions exists between those two techniques where neither is very useful.

An apparatus and method of measuring surface irregularities using a hybrid Moiré-interference technique is disclosed in Jaerisch et al. in U.S. Pat. No. 3,858,981 issued Jan. 7, 1975. Since the output of the apparatus is a fringe pattern, a human operator is required to extract and to quantify the output. In addition, the apparent surface irregularities manifest in the output fringe pattern are those with respect to some datum plane of the apparatus and not with respect to the best fitting least squares plane. Therefore, this technique is extremely cumbersome, time consuming and expensive since a human operator is an integral part of the apparatus.

It has been suggested (Harrison — IBM Technical Disclosure Bulletin Vol. 13 No. 3 Aug. 1970 pages 789–790) that the scanning of a specular or semi-specular surface with a collimated laser beam, and measuring the displacement of the reflected beam with a photoelectric position sensor, could be used to measure the surface profile of the surface. This technique is well suited to the problem; but the method suggested by Harrison has certain difficulties. In order to get the desired results, it is necessary that the surface of the test article be perpendicular to the incident light beam, or the resultant profile measurement will include the tilt of the surface. The necessity for such an adjustment precludes rapid measurements, since the mechanical tilt changes from sample to sample. Moreover, Harrison uses his collimating lens off-axis, thereby introducing a source of error into his measurements. The most serious limitation of Harrison's apparatus is that it provides only a surface profile along one line of the test article surface.

While these prior-art techniques for measuring surface profiles are useful for some measurements, they cannot be used for accurate measurements required in many industrial operations. For example, in the electronics industry it is desirable to measure the surface profile and nonflatness over the entire surface of the silicon wafers used in the manufacture of integrated circuits. Similarly, in the electronics industry it is desirable to measure the surface profile and nonflatness over the entire surface of the glass photomasks used in the photolithography portion of the manufacturing process. In both of these examples, the nonflatness of the surface is in the dimensional range from 0.000005 to 0.0005 in., i.e. $\lambda/5$ to $25\lambda$, where $\lambda=6328A$, the surfaces are specular reflectors, and large quantities of articles must be measured very rapidly. Similar requirements exist in the optical industry where a great variety of reflective surfaces and transparent products, e.g. lenses, lens assemblies, windows and prisms must be measured in large quantities accurately, rapidly and economically. To this end, measurement apparatus is required for both reflective surfaces and transparent articles which rapidly yields a signal indicating whether the deviations over the entirety of the test articles are within or outside a predetermined tolerance range.

In our copending application Ser. No. 492,781, we have disclosed a surface profilometer which is capable of rapidly measuring the surface profile and nonflatness of many articles, independent of the tilt of the surface, with easily variable sensitivity and good accuracy along a scan line.

In working with the embodiments of the invention disclosed in our above-identified application, we have encountered some problems. It is extremely difficult to produce a multi-faceted scanner prism which reflects incident light in exactly the same plane; the slight differences which are obtained with commercial prisms of this type introduce a slight dither in the position of the measurement beam which introduces a dither in the output of the instrument — enough so that for some very precise measurements, the accuracy requirements are difficult to meet. More importantly, however, is the fact that when multiple scans over a single surface are desired, to essentially map a surface, it is difficult to get the desired accuracy. Movement of either the beam or the test object at commercially desirable measurement rates is either accompanied by a varying tilt between the scanning beam and the test object surface or is involved in expensive and intricate mechanisms for producing the desired movement in one plane while maintaining a fixed transverse plane.

OBJECTS OF THE INVENTION

The principal objects of the present invention are the simultaneous elimination of the above-mentioned dither with the solution of the problem of producing multiple scanning lines across the test object without mechanically changing the position of either the test object or the measurement apparatus, and the extension of the utility of the device to the measurement of other than planar reflective surfaces, and to the measurement of light beam deviating properties of transparent objects such as lenses.

STATEMENT OF THE INVENTION

To meet these objects, we provide, in accordance with the present invention, (1) a source of radiant energy, most preferably polarized light from a laser, to produce a narrow beam (2) means for scanning said beam to produce a scanning beam, said means being most preferably a uniformly rotating, multifaceted reflector which has suitably chosen pyramidal angles and which is placed near the focal point of (3) a collimating lens which collimates said scanning beam to provide a raster scanning beam which moves in a series of laterally spaced lines over the test article (4) means for collecting said raster scanning beam after it has probed the test article to provide an auto-reflected, collected beam (5) means for focusing said autoreflected, collected beam onto a photoelectric position sensor and (6) means for processing the outputs of the position sensor to yield information with respect to the light beam deviating properties of said test article.

For reflective test objects, the processing means (6) yields outputs indicative of the two first spatial derivatives of the test object surface profile, and is combined with (7) further means for processing the outputs of the position sensor to yield the surface profile of the test article and (8) means for processing the outputs of the position sensor to yield the surface profile independent of the tilt of alignment of the surface of the test article relative to the apparatus.

For transparent test objects, a master reflector surface is provided, so that the raster scanning beam, after it passes through the test object, is autoreflected to get double pass transmission through the transparent test object; the output processing means (6) then yields information indicative of the light beam deviating properties of the test object.

The apparatus is provided wit means for processing the outputs of the position sensor when it is necessary to subtract the repeatable errors in the optical system. This result is preferably obtained by inserting a master test article into the apparatus, and storing the output obtained from it in a memory, and comparing the outputs obtained from test article with the outputs stored in the memory.

DETAILED DESCRIPTION OF THE INVENTION

The Drawings

In the drawings,

FIG. 4 illustrates typical arrangements in which the apparatus is used to measure test articles with reflective surfaces: 4(a) a concave spherical surface and 4(b) a convex spherical surface.

FIG. 5 illustrates typical arrangements in which the apparatus is used to measure the light beam deviating properties of a transparent article: 5(a) a window, 5(b) a prism, 5(c) a lens.

DETAILED DESCRIPTION OF THE INVENTION

Figure 1:
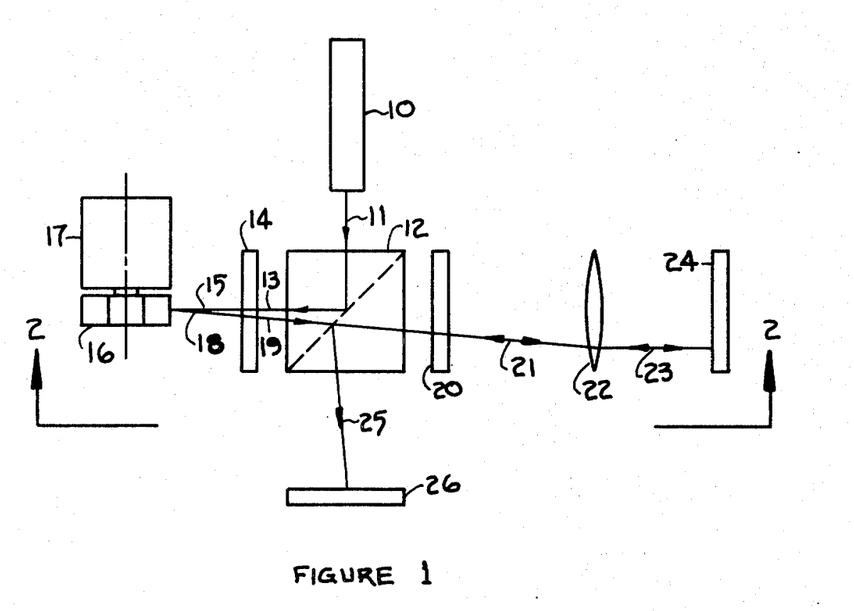
FIG. 1 is a schematic diagram showing a top view of the apparatus' optical system.
Figure 2:
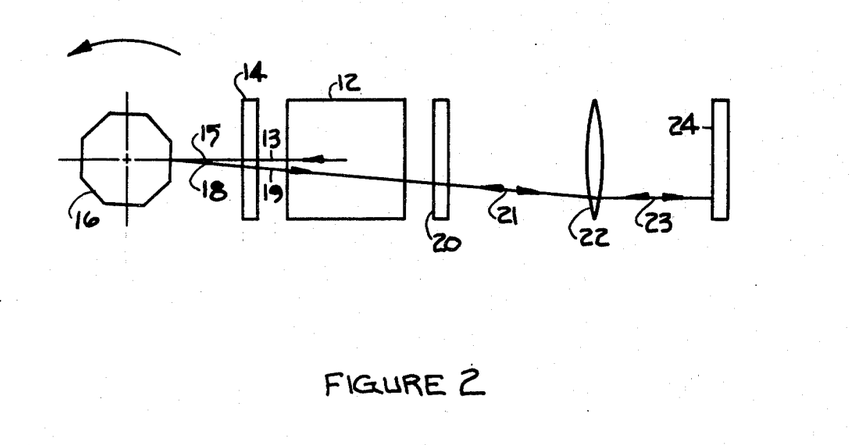
FIG. 2 is a sectional view of the apparatus' optical system along the line 2—2 of FIG. 1.

Description and Explanation of FIGS. 1 and 2.

While the apparatus has application for a wide range of radiation sources, the following description is taken by way of example with respect to an optical measuring system. The term "radiant energy" as used herein includes, but is not limited to electromagnetic energy of all frequency ranges.

FIG. 1 is a schematic diagram showing a top view of the apparatus' optical system.

A light source such as a tungsten bulb, xenon bulb, light-emitting diode, laser diode, or other source of radiant energy, and most preferably a gas laser, 10 provides optical energy for the narrow, nearly collimated, linearly polarized beam 11 in FIG. 1. The polarization vector of beam 11 is normal to the plane of FIG. 1. Polarization beamsplitter 12 totally reflects beam 11 to produce beam 13 which is parallel to the optical axis of collimating lens 22. The polarization vector of beam 13 is also normal to the plane of FIG. 1. A polarization beamsplitter transmits the p polarization component of the input beam and reflects the s polarization component of the input beam. The p label denotes the polarization component in the plane defined by the incident beam and the normal to the beamsplitter surface. The s label denotes the polarization component perpendicular to the plane defined by the incident beam and the normal to the beamsplitter surface. The orientation of the polarization of the linearly polarized beam 11 is such that it is entirely s component. The quarter-wave phase retardation plate 14 has its optic axis oriented at 45° with respect to the direction of polarization of the incident beam 13. The linearly polarized light is thusly converted to a circularly polarized beam 15. The reason for using a polarization beamsplitter in conjunction with a quarter-wave phase retardation plate is to provide minimum loss of radiant energy at the beamsplitter. This configuration increases the light throughput efficiency by about a factor of four over a conventional 50—50 beamsplitter for a linearly polarized incident beam. In addition, use of the beamsplitter assures on-axis use of the collimating lens 22. Beam 15 is reflected by the uniformly rotating, multi-faceted reflector device 16 to produce the angularly scanned beam 18. The device 16 is preferably designed so that the pyramidal angle of each reflecting facet is offset relative to each of the other reflecting facets sufficiently so that the reflection from each facet is separated from the reflection of every other facet. By so separating the reflections, the plurality of facets produces a plurality of scanning lines, which produce a raster pattern which can be made to fall over the entire surface of the test article, permitting mapping of an entire surface with each complete rotation of the multi-faceted reflector device.

Obviously, it is desirable to have the raster regular, with comparatively equal spacings. This is difficult to accomplish with a fixed facet prism, so that preferably we use a multi-faceted reflector device in which the position of the facets can be adjusted relative to each other. Such devices for producing reflected scanning raster patterns are known, for example, see Ives et al. U.S. Pat. No. 3,529,884 issued Sept. 22, 1970. The facets can be adjusted as desired to get an evenly spaced raster over the test surface, as shown in FIG. 3.

Furthermore, an adjustable multi-faceted reflector device eliminates the aforementioned dither induced problem.

The device 16 is located so that the reflecting facets are at the back focal point of collimating lens 22. The device 16 is rotated uniformly by the electro-mechanical transducer 17, which is comprised of a motor and bearing assembly. When circularly polarized beam 18 passes through the quarter-wave phase retardation plate, beam 18 is transformed to a pure p polarization state. Therefore, beam 19 is totally transmitted by the polarization beamsplitter 12. After emerging from polarization beamsplitter 12, beam 19 passes through the second quarter-wave phase retardation plate 20 which has its optic axis oriented at 45° with respect to the direction of polarization of beam 19. The linearly polarized beam 19 is thusly converted to a circularly polarized beam 21. The reason for using this quarter-wave phase retardation plate is the same as mentioned earlier. Collimating lens 22 converts the angularly scanned beam 21 into a uniformly, linearly scanned beam 23. The measurement beam 23 is incident upon the test article 24. For a flat, specularly reflective article as shown in FIG. 1, the surface should be approximately normal to the measurement beam 23 to produce an autoreflection. The circularly polarized beam reflected by surface 24 is collected by lens 22, has its polarization converted to pure s state by the quarter-wave phase retardation plate 20 and is totally reflected by polarization beamsplitter 12 to produce a beam 25 which is focused onto the two-axis photoelectric position sensor 26. The position sensor 26 provides outputs indicating the Cartesian coordinates of the spot of light on its photo-sensitive surface.

Figure 3:
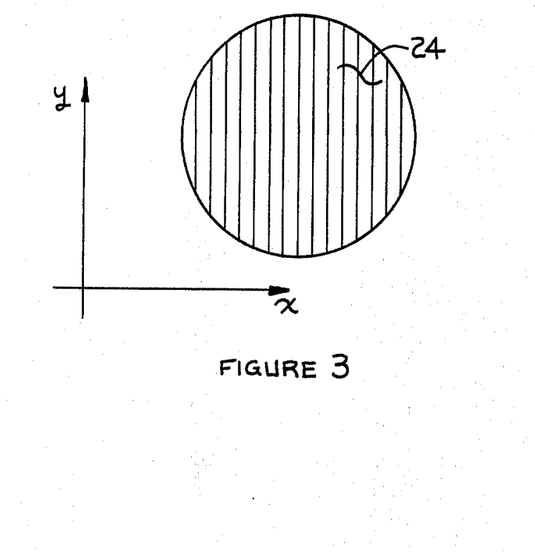
FIG. 3 is a plan view of the scan pattern on the test article.

Description and Explanation of FIG. 3

FIG. 3 shows the raster pattern followed by beam 23 as it scans the test article 24. Each line of the raster is produced by one of the reflector facets of the device 16. The motion along each line of the raster is produced by the rotation of the reflector device 16. The spacing between two adjacent scan lines is set by adjusting the offset in the pyramidal angle of adjacent reflector facets. By appropriately adjusting the pyramidal angles of the device 16, the plurality of facets produces a plurality of scanning lines, which produce a raster pattern which can be made to fall over the entire surface of the test article, permitting mapping of an entire surface with each complete rotation of the multifaceted reflector device 16.

Figure 4:
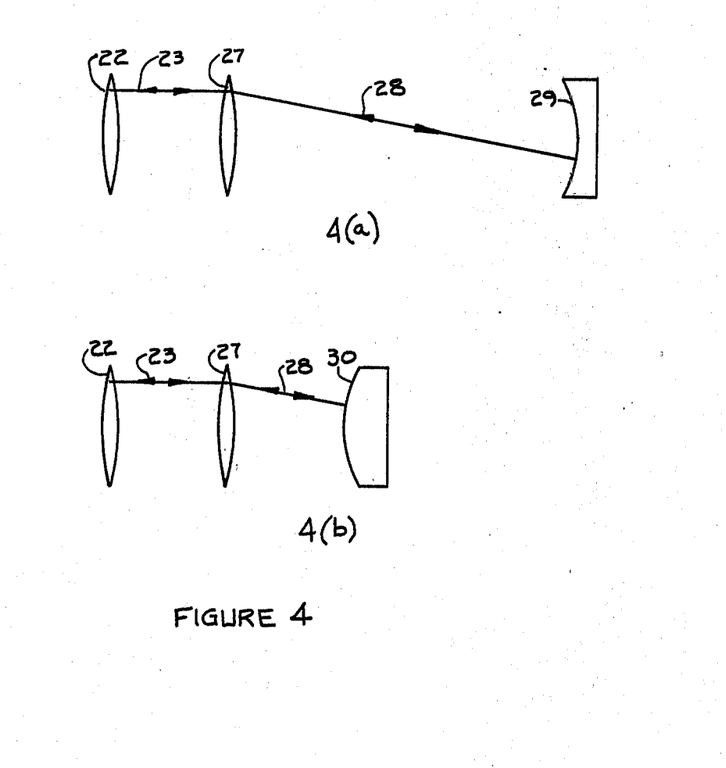

Description of Explanation of FIG. 4

FIG. 4 illustrates typical arrangements in which the apparatus is used to measure test articles with reflective surfaces: 4(a) a concave spherical surface and 4(b) a convex spherical surface.

Referring to FIG. 4(a), a decollimating lens 27 is introduced in the raster scanned measurement beam 23 to produce a beam 28. The test article 29 which has a concave reflective surface 29 is placed so that the center of curvature of the concave surface coincides with the focal point of lens 27 and such that surface 29 autoreflects the beam 28. Such a configuration assures that an autoreflected beam is produced after the measurement beam (28) has been reflected by the test article surface. The combination of the auxiliary lens 27 and the suitably placed spherical reflector produces an autoreflected beam similar to that shown in FIG. 1 for a flat reflective surface. As long as the errors introduced by lens 27 are negligible or suitably compensated, measurement outputs indicative of the surface 29 are provided by the apparatus.

Referring to FIG. 4(b), the center of curvature of the convex test surface 30 is coincident with the focal point of lens 27 such that surface 30 autoreflects the beam 28. Similarly to 4(a), this configuration assures that an autoreflected beam is produced after the measurement beam 28 has been reflected by the test article surface. Similarly to case in FIG. 4(a), as long as the errors introduced by the lens 27 are negligible or suitably compensated, measurement outputs indicative of the surface (30) are provided by the apparatus.

Figure 5:
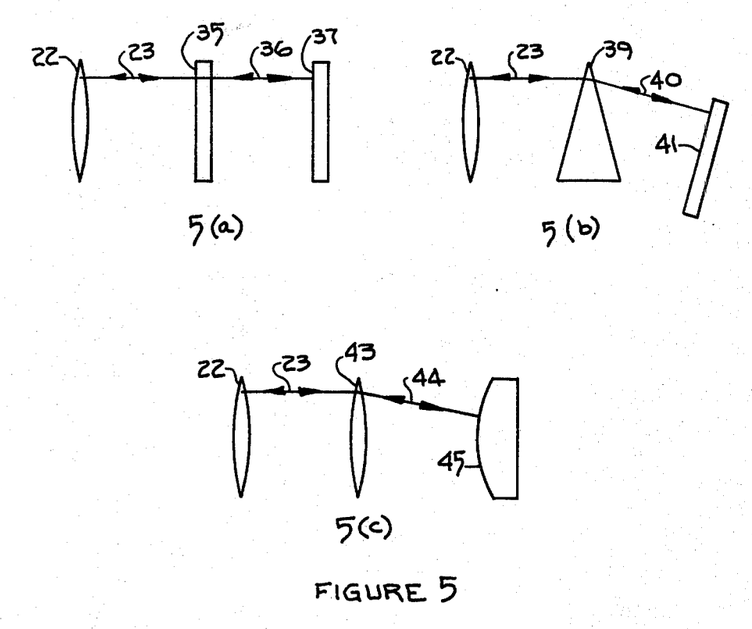

Description and Explanation of FIG. 5

FIG. 5 illustrates typical arrangements in which the apparatus is used to measure the light beam deviating properties of a transparent article: 5(a) a window, 5(b) a prism, 5(c) a lens.

In FIG. 5(a) the scanning measurement beam 23 passes through the transparent window 35. The transmitted beam 36 is autoreflected by a flat master reflector 35. The beam 36 then passes back through the window 35 to be collected by lens 22 of the apparatus. The angular orientation of master reflector 37 is adjusted so that the beam collected by lens 22 is nominally parallel to beam 23.

In FIG. 5(b), the scanning measurement beam 23 passes through and is deflected by the transparent prism 39 to produce beam 40. The flat master reflector 41 autoreflects beam 40 so that the beam collected by lens 22 is nominally parallel to beam 23.

In FIG. 5(c), the scanning measurement beam 23 passes through and is focused by the lens to be measured 43 to produce beam 44. The spherical master reflector 45 is placed so that the center of curvature of its master sphericl surface coincides with the focal point of lens 43 and such that surface 45 autoreflects beam 44. In this use of the apparatus, proper alignment of the lens 43 is essential to get meaningful information with respect to the lens.

As long as the errors introduced by the flat or spherical master reflectors in the above configurations are negligible or suitably compensated, measurement outputs indicative of the beam deviating properties of the transparent article are provided.

Figure 6:
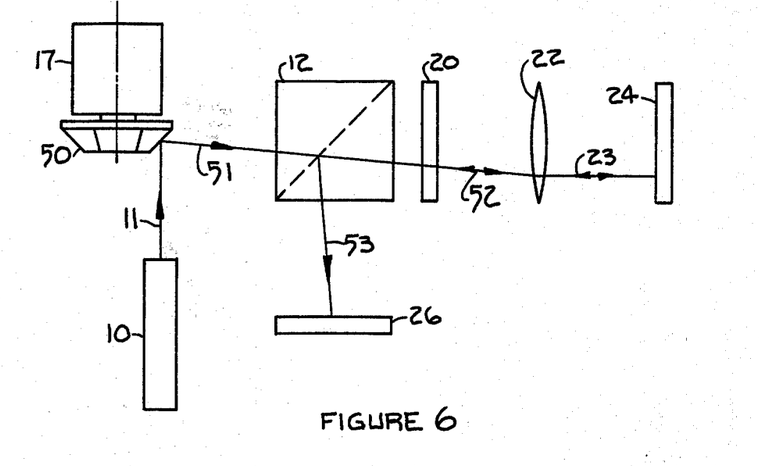
FIG. 6 is a schematic of an alternative embodiment of the optical system.

Description and Explanation of FIG. 6

FIG. 6 is a schematic of an alternative embodiment of the optical system.

The apparatus of FIG. 6 differs from that of FIG. 1 in that only one phase retardation plate is required and the linear speed of the scanning measurement beam is reduced by a factor of two for a given rotational speed of the reflector device. The first difference is advantageous from the point of view of simplicity and economy. The second difference is desirable since the requirements on the speed of the electronics can be relaxed.

In FIg. 6, the laser 10 provides optical energy for the narrow, nearly collimated, linearly polarized beam 11. The polarization vector of beam 11 is in the plane of FIG. 6. Beam 11 is reflected by the uniformly rotating, multi-faceted reflector device 50 to produce the angularly scanned beam 51. The device 50 is preferably designed so that the pyramidal angle of each reflecting facet is offset relative to each of the other reflecting facets similar to the device 16 of FIG. 1.

The device 50 is located so that the reflecting facets are at the back focal point of collimating lens 22. The device 50 is rotated uniformly by the electro-mechanical transducer 17, which is comprised of a motor and bearing assembly.

Beam 51 is totally transmitted by polarization beamsplitter 12. The quarter-wave phase retardation plate 20 has its optic axis oriented at 45° with respect to the direction of polarization of the incident beam 51. The linearly polarized light is thusly converted to a circularly polarized beam 52. The reason for using this quarter-wave phase retardation plate is the same as mentioned earlier. Collimating lens 22 converts the angularly scanned beam 52 into a uniformly, linearly scanned beam 23. The measurement beam 23 is incident upon the test article 24. The circularly polarized beam reflected by surface 24 is collected by lens 22, has its polarization converted to pure s state by the quarter-wave phase retardation plate 20, and is totally reflected by polarization beamsplitter 12 to produce a beam 53 which is focused onto the two-axis photoelectric position sensor 26. The position sensor 26 provides outputs indicating the Cartesian coordinates of the spot of light on its photo-sensitive surface.

Figure 7:
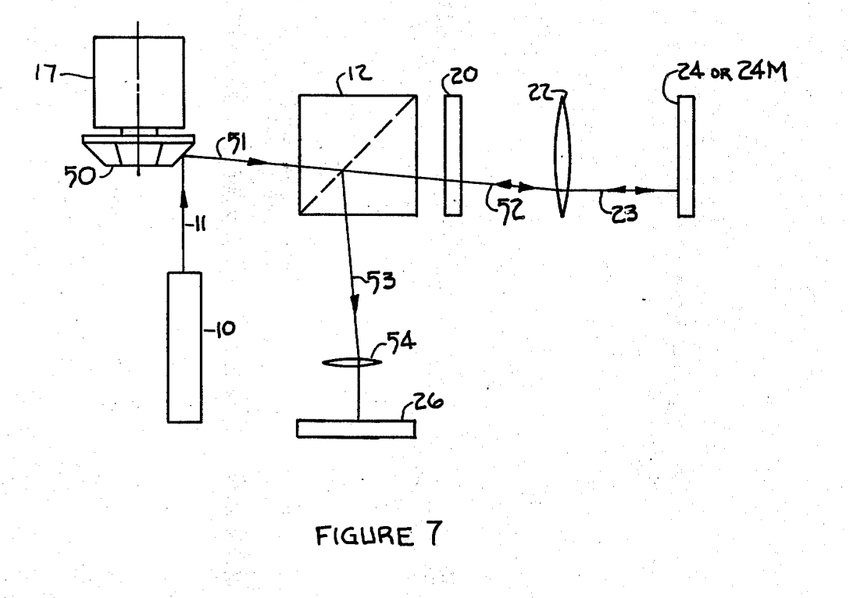
FIG. 7 is a schematic diagram showing a modified embodiment of the apparatus.

Description and Explanation of FIG. 7

FIG. 7 is a schematic diagram showing a modified embodiment of the apparatus and its use in a differential fashion.

FIG. 7 shows a modification of the device of FIG. 6 if greater accuracy is desired. A magnifying lens 54 is positioned in the path of beam 53 so that it images the focus of beam 53 onto the position sensor 26, thereby increasing the sensitivity of the device, and assuring greater accuracy but less dynamic range.

Figure 10:
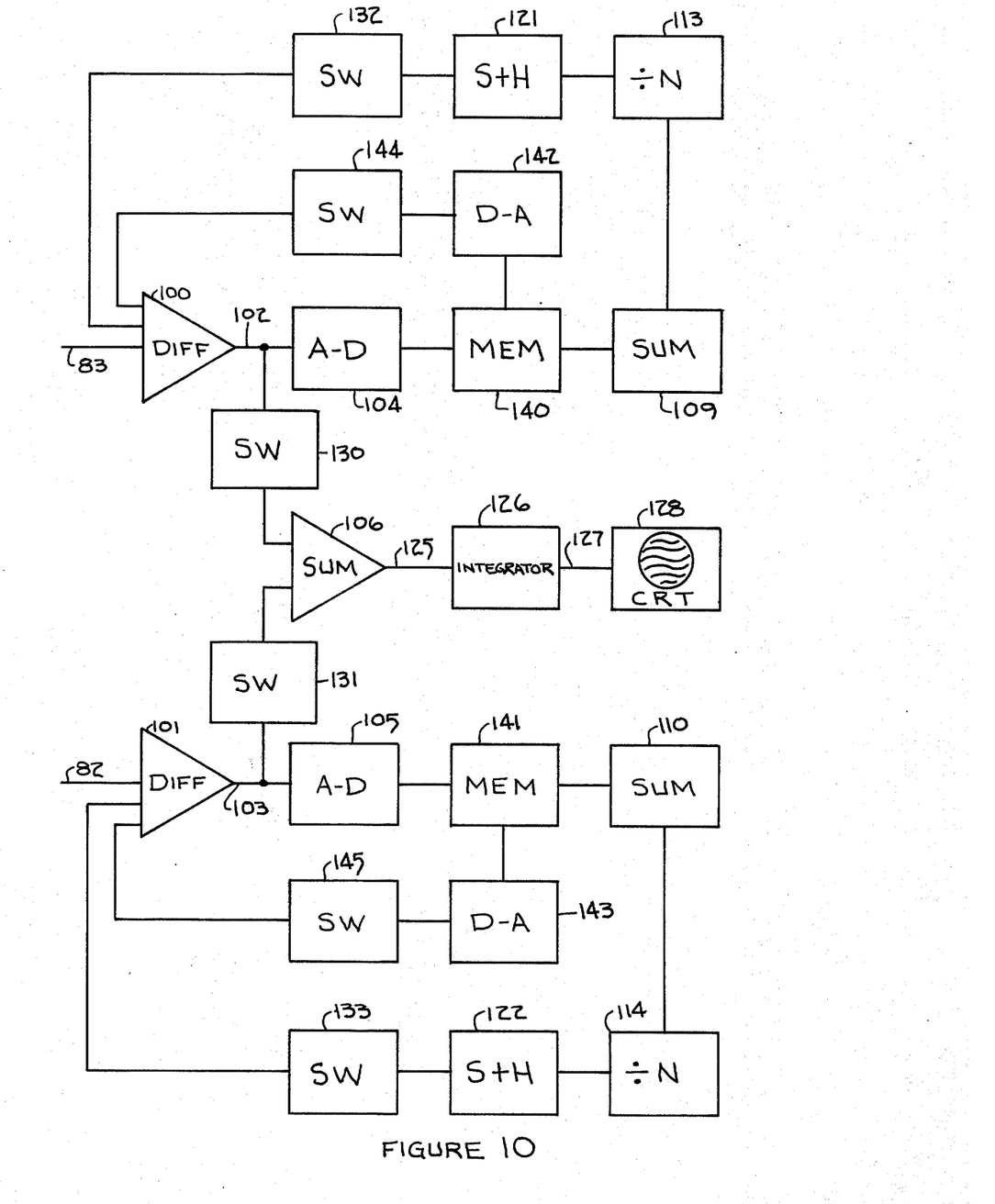
FIG. 10 is a block diagram of the circuitry used to yield signals indicative of the properties of the test article in such a way that the repeatable apparatus errors are eliminated and the apparatus can be used in a differential mode.

A master test object 24M is provided for insertion in the place occupied by test object 24, so that its surface profile can be measured. By the use of appropriate circuitry such as is shown in FIG. 10, fixed errors in the optical system can be eliminated from the measurements obtained with the apparatus.

Figure 8:
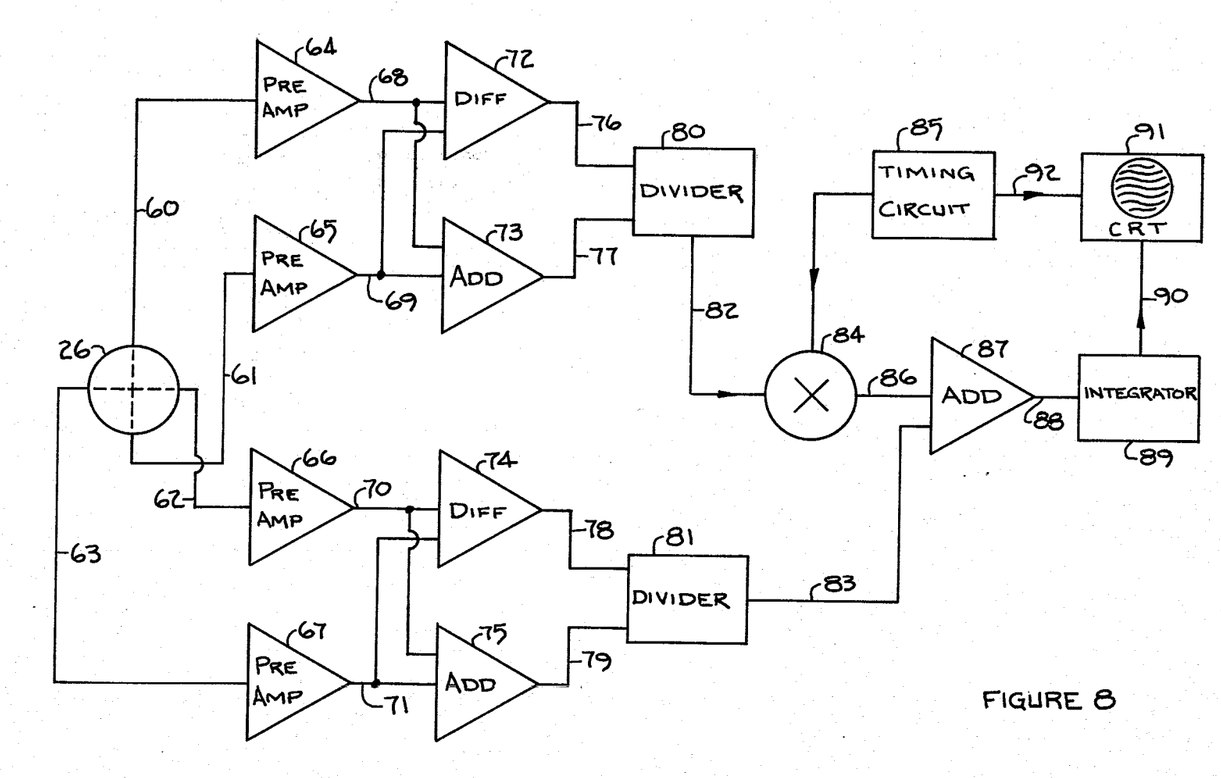
FIG. 8 is a schematic block diagram of the circuitry used to process the outputs of the two-axis photoelectric position sensor to yield signals indicative of the properties of the test article.

Description and Explanation of FIG. 8

FIG. 8 is a schematic block diagram of the circuitry used to process the outputs of the two-axis photoelectric position sensor to yield signals indicative of the properties of the test article.

If the surface of a reflective test article is represented as $Z(x,y)$, then the Cartesian coordinates of the spot of light on the position sensor 26 are given by $$X(x,y) = 2 \cdot f \cdot \frac{\delta Z(x,y)}{\delta x} - M_x \quad (1)$$

$$Y(x,y) = 2 \cdot f \cdot \frac{\delta Z(x,y)}{\delta y} - M_y \quad (2)$$

where $f$ is the focal length of lens 22 and $M_x$ and $M_y$ are the $x$ and $y$ components, respectively, of the angular deviation, i.e., tilt, of the surface 24 from perfect perpendicularity to beam 23. $M_x$ and $M_y$ are constants when the apparatus and test article are fixed relative to each other. The preceding equations can be rewritten in the form $$\frac{\delta Z(x,y)}{\delta x} = \frac{X(x,y)}{2f} - M_x \quad (3)$$

$$\frac{\delta Z(x,y)}{\delta y} = \frac{Y(x,y)}{2f} - M_y \quad (4)$$

Thus, knowing $x$, $y$ and $f$ yields $(\delta Z/\delta x)$ and $(\delta Z/\delta y)$ to within unknown constants $M_x$ and $M_y$, respectively. It will be shown later how the unknown constants $M_x$ and $M_y$ which are variable from set-up to set-up can be measured and compensated. Nevertheless, integration of equation (4) yields the profile $Z(x,y)$.

$$Z(x,y) = \int_0^y \left[ \frac{Y(x,y')}{2f} - M_y \right] dy' + K_1 \quad (5)$$

where $K_1$ is a constant of integration.

For a linearly scanned beam 23, the scan speed $V_s$ is given by $V_s = 2 \cdot \theta_m \cdot f$, where $\theta_m$ is the angular speed of the device 16, and $f$ is the focal length of lens 22. Since $\theta_m$ is a constant, $y = V_s \cdot t$, where $t$ denotes time. Thus, $(dy/dt = V_s)$. Therefore, the above equations can be represented with $t$ as the independent variable rather than spatial coordinate $y$ using the substitutions $y = V_s \cdot t$ and $dy/dt = V_s$.

The two-axis photoelectric position sensor 26 is a commercially available, solid-state device, e.g., the PIN-SC/10 produced by United Detector Technology, Inc., which has two outputs per axis. The outputs are shown as 60, 61, 62 and 63 in FIG. 8. The outputs 60, 61, 62 and 63 represent photoelectric currents. The magnitude of each photoelectric current is proportional to the position of the light spot relative to the zero position and to the light power, i.e., watts, in the spot. Outputs 60 and 61 correspond to the x axis, and the outputs 62 and 63 correspond to the y axis.

When the spot is centered on the zero position, the photocurrents for each axis are equal. As the spot moves to one side of the zero position along an axis, the photocurrent for that side increases in proportion to the distance moved, and the photocurrent for the other side decreases in proportion to the distance moved. Therefore, the difference between the two photocurrents for an axis is a measure of the distance between the center of the light spot and the zero position of that axis. However, the constant of proportionality is directly a function of the light power in the light spot. Thus, if either the output power of the laser or the reflectivity of the sample varies, or both vary, uncertainty is introduced in the quantitative information relating the position of the spot to the difference between the two photocurrents. In order to overcome this difficulty, it is necessary to use the ratio of the difference to the sum of the two photocurrents per axis as the quantity which unambiguously indicates the position of the light spot.

In FIG. 8, the preamplifiers 64, 65, 66 and 67 provide impedance matching and voltage outputs for the photocurrents 60, 61, 62 and 63 respectively. Amplifiers 72, 73, 74 and 75 yield the required sum and difference signals which are then used as inputs to the dividers 80 and 81 which form the ratio of the difference to the sum. The output 82 of divider 80 is directly proportional to the x coordinate of the position of the spot of light on the sensor 26. Similarly, the output 83 of divider 81 is directly proportional to the y coordinate of the position of the spot of light on the sensor 26.

The output 83 is applied to the integrator 89 after passing through the adder 87. The integrator 89 performs the integration expressed in equation (5) per scan line. The timing circuits 85, the switch 84 and the adder 87 function to convert $(\delta Z/\delta x)$ values to the appropriate constant of integration $K_1$ in equation (5) so that the $Z(x,y)$ profiles for successive scan lines are related to each other.

The output 90 can be displayed on a CRT, i.e. cathode ray tube, or storage oscilloscope 91. A commercially available oscilloscope or CRT monitor is suitable for most applications.

The sensitivity on the CRT monitor is easily varied simply by varying the gain on the appropriate scale.

Figure 9:
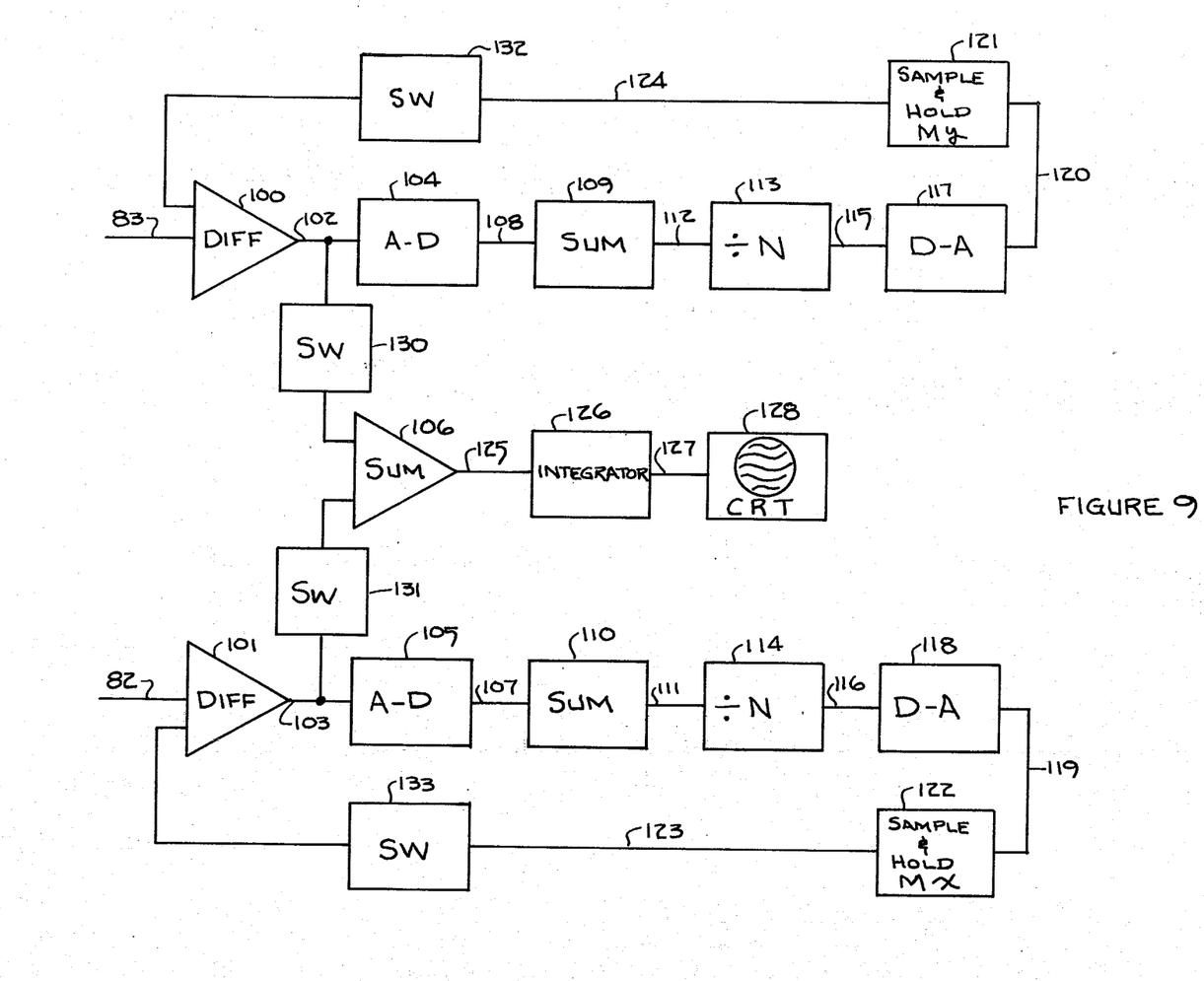
FIG. 9 is a schematic block diagram of the circuitry used to yield signals indicative of the properties of a reflective test article surface which are independent of the tilt of the reflective test article surface relative to the apparatus.

Description and Explanation of FIG. 9

FIG. 9 is a schematic block diagram of the circuitry used to yield signals indicative of the properties of the test article surface which are independent of the tilt of the test article surface relative to the apparatus.

In FIG. 9, the outputs 82 and 83 are applied on alternate scans to the input of integrator 126.

Averaging the values of $(\delta Z/\delta x)$ and $(\delta Z/\delta y)$ on one scan of the test article, i.e., one revolution of device 16, is used to provide $M_x$ and $M_y$. The analog to digital converters 104 and 105 provide digital inputs to the averaging circuitry, i.e., the sum and $\div N$ where N is the number of measurements taken over the test article. The average values of $(\delta Z/\delta x)$ and $(\delta Z/\delta y)$, i.e., $M_x$ and $M_y$ respectively, are held in the sample and hold circuits 121 and 122.

On the next scan the $M_x$ and $M_y$ values determined on the previous scan are subtracted from the $(\delta Z/\delta x)$ and $(\delta Z/\delta y)$ values by amplifiers 101 and 100. On the second scan, output 127 corresponds to $Z(x,y)$ of equation (5). The switches 131 and 130 and adder 106 function to convert $(\delta Z/\delta x)$ and $M_x$ values to the appropriate constant of integration $K_1$ in equation (5) so that the $Z(x,y)$ profiles for successive scan lines are related to each other.

Description and Explanation of FIG. 10

FIG. 10 is a block diagram of the circuitry used to yield signals indicative of the properties of the test article in such a way that the repeatable apparatus errors are eliminated and the apparatus can be used in a differential mode.

The utility of the apparatus can be significantly expanded using the circuitry schematically illustrated in FIG. 10. By adding the memories 140 and 141, it is possible to place a master article 24M of FIG. 7 in the measurement beam 23 such that the repeatable apparatus errors are retained in the memories 140 and 141. Now when a test article is placed in measurement beam 23, the digital-to-analog converters 142 and 143 in conjunction with switches 144 and 145 permit subtraction of the errors using amplifiers 100 and 101.

Not only can repeatable system errors be eliminated, but by placing the master test article 24M in the measurement beam and placing its outputs into the memories 140 and 141, the apparatus will then provide the deviations of subsequently measured test articles from the master test article. This feature can be particularly useful for complex or irregular test articles.

Obviously, changes can be made in the specific apparatus shown without departing from the scope of the invention as defined in the claims.

What is claimed is:

1. A device for measuring the surface profile of a reflective test article or the light beam deviating properties of a transparent test article which comprises (1) a source of radiant energy which produces a narrow beam of light (2) means for scanning said beam and passing it through (3) means for collimating said beam to provide a raster scanning beam which moves in a series of laterally spaced lines over the test article (4) means for collecting said raster scanning beam after it has probed the test article to provide an auto-reflected, collected beam (5) means for focusing said autoreflected, collected beam onto a photoelectric position sensor and (6) means for processing the outputs of the position sensor to yield information with respect to the light beam deviating properties of said test article.

2. The device of claim 1, in which the means (2) for scanning said beams comprises a uniformly rotating, multi-faceted reflector which has suitably chosen pyramidal angles and which is placed near the focal point of a collimating lens which collimates said beam to provide a raster scanning measurement beam.

3. The device of claim 2, in which the multi-faceted reflector has facets which are adjustable relative to each other.

4. The device of claim 2, where the test article is reflective and the means (6) for processing the outputs of the position sensor includes (6A) means for producing outputs indicative of the two first spatial derivatives of the surface profile of the test article (7) means for processing the outputs of the position sensor to yield the surface profile of the test article and (8) means for processing the outputs of the position sensor to yield the surface profile independent of the tilt or alignment of the surface of the test article relative to the apparatus.

5. The device of claim 4, in which there is also included means for processing the outputs of the position sensor to subtract repeatable errors in the optical system of the device which comprises a memory into which outputs from a master article can be fed for comparison with outputs from the test article, and means for comparing the outputs from the master article and the test article.

6. The device of claim 4 in which the test article is curved, and a lens of suitable properties is inserted into the system to ensure that the raster scanning beam is autoreflected from the test article.

7. The device of claim 2, where the test article is transparent, and the device includes a master reflector surface which is so placed and whose surface contour is so related to the light ray deviating properties of the test article, that the raster scanning beam, after it passes through the test article, is autoreflected for double pass transmission through the transparent test article.

8. The device of claim 7, in which there is also included means for processing the outputs of the position sensor to subtract repeatable errors in the optical system of the device, which comprises a memory into which outputs from a master article can be fed for comparison with outputs from the test article, and means for comparing the outputs from the master article and the test article.

9. The device of claim 2, in which the source of energy is a gas laser which produces a narrow beam of collimated light.

* * * * *